United States Patent [19]

Sadjian

[11] Patent Number: 4,649,518
[45] Date of Patent: Mar. 10, 1987

[54] OPTICAL RECORDING DEVICE
[76] Inventor: Harry Sadjian, 207 Surrey Rd., Southampton, Pa. 18966
[21] Appl. No.: 752,915
[22] Filed: Jul. 8, 1985
[51] Int. Cl.⁴ .............................................. G11C 11/42
[52] U.S. Cl. ..................................................... 365/119
[58] Field of Search ........................... 365/119; 372/72
[56] References Cited
U.S. PATENT DOCUMENTS 3,771,150  11/1973  Schneider ........................... 365/119
4,091,375  5/1978  Robillard ............................ 365/119

OTHER PUBLICATIONS

Pp. 28–30 of *Proceedings of a Physical Society* by R. W. Pohl, (London), vol. 40 E3 (1937).
Pp. 89–91 from *Review of Modern Physics*, vol. 26, No. 1, Jan. 1954.
Pp. 109–110 of book, "Physics of Color Centers", edited by W. Beall Fowler, Academic Press, New York & London (1968).

*Primary Examiner*—James W. Moffitt
*Attorney, Agent, or Firm*—Dann, Dorfman, Herrell & Skillman

[57] ABSTRACT

An optical recording device includes a crystal selected from the group of alkali metal halides or alkali-earth halides and is doped with an alkali metal dopant and negative hydride ions to form a doped crystal. The doped crystal is formed to have a hydride light absorption band centered about a predetermined frequency and a color center light absorption band centered about another predetermined frequency. The doped crystal exhibits two switching states with the first state having a light absorption level in the hydride band and a low light absorption level in the color center band and a second state having a light absorption level in the hydride band and a high light absorption level in the color center band. The doped crystal is repeatedly switchable between the states by the irradiation of switching light of a selected intensity in the hydride band to switch the state of the doped crystal from the first state to the second state and by the irradiation of switching light of a selected intensity in the color center band to switch the state of the doped crystal from the second state to the first state. Multi-layered devices employing different doped crystal layers may be employed to vertically store additional bits of information.

55 Claims, 8 Drawing Figures

OPTICAL RECORDING DEVICE

FIELD OF THE INVENTION

The present invention relates to an optical recording device, and, more particularly, to an optical recording device which includes a doped crystal structure for optically storing bits of information through the use of light.

BACKGROUND OF THE INVENTION

The need for the storage and retrieval of information in modern society is increasing at a rapid rate. In most computer-based information systems, bits of information are conventionally stored in magnetic memories. For example, magnetic tape and disc storage systems are in prevalent use with many types of computer systems ranging from main frame computers to home computers. In a magnetic memory, bits of information are magnetically stored or recorded on a magnetic recording medium.

Recently, optical storage and retrieval systems have been considered and proposed as alternatives or, at least, as supplements to the conventional magnetic storage systems. In conventional optical storage systems, bits of information are stored in various types of recording mediums and the bits of information are readable by light through different mechanisms, such as changes in reflectivity or polarization.

In accordance with the present invention, an optical storage device is provided which optically stores bits of information. The optical storage device in accordance with the present invention is extremely effective and has a wide range of applicability in optical storage and retrieval systems. Optical storage devices in accordance with the present invention may be designed to provide an erasable memory having a relatively fast switching time for recording and erasing bits of information.

SUMMARY OF THE INVENTION

In accordance with the present invention, an optical recording device is provided for the optical storage and retrieval of bits of information. The optical recording device includes a crystal selected from the group of alkali metal halides and alkali-earth halides. The crystal is doped with an alkali metal dopant and negative hydride ions to form a doped crystal having a hydride light absorption band centered about a particular frequency and a color center light absorption band centered about another particular frequency.

The crystal is sufficiently doped with the alkali metal dopant and the negative hydride ions to exhibit two switching states. The first state has a predetermined light absorption level in the hydride band and a low light absorption level in the color center band and the second state has a predetermined light absorption level in the hydride band and a high light absorption level in the color center band. The doped crystal is repeatably switchable between the first and second states by the irradiation of switching light onto the doped crystal. The irradiation of switching light of a selected intensity for a predetermined time period in the hydride band switches the state of the doped crystal from the first state to the second state. Similarly, the irradiation of switching light of a selected intensity for a predetermined time period in the color center band switches the state of the doped crystal from the second state back to the first state.

The doped crystal provides a non-volatile optical memory for bits of information by exhibiting one or the other state until such state is switched by the irradiation of the appropriate switching light. Since the doped crystal switchably exhibits two states, the doped crystal erasably stores bits of information. The state of the doped crystal is readable, for example, by measuring the transmission of a read light through the crystal in the respective first and second states, the read light having an intensity insufficient to switch the state of the doped crystal.

BRIEF DESCRIPTION OF THE DRAWINGS

The foregoing summary, as well as the following detailed description of the preferred embodiments of the present invention, will be better understood when read in conjunction with the accompanying drawings, in which.

DESCRIPTION OF THE PREFERRED EMBODIMENT

Figure 1:
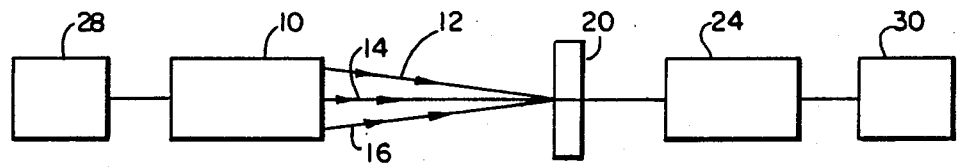
FIG. 1 is a diagrammatic view of an optical recording system employing an optical recording device in accordance with Applicant's invention.

Referring to FIG. 1, a computer-controlled optical recording system which includes a light source 10 for selectively producing a write light 12, a read light 14, and an erase light 16 is depicted. An optical recording device 20, which may simply be an optical recording medium, optically stores bits of information as digital "highs" or "lows" in response to the application of the write light 12 and the erase light 16. In order to read the bits of information stored in the optical recording device 20, a read mechanism 24 is employed for measuring and detecting the transmission of the read light 14 through the optical recording device 20. The transmission of the read light through the device 20 changes between a high amount and a low amount depending on whether a particular bit of information is recorded in the device 20 as a digital "high" or "low".

In order to record bits of information, the optical recording device 20 is switchable between a relatively opaque state and a relatively transparent state for a given frequency of light. The relatively opaque and transparent states correspond to the digital "high" and "low" states and can be read by the read mechanism 24 by detecting the relative amount of the read light transmitted through the optical recording device in both the opaque state and the transparent state. For computer applications, a computer interface 28 is connected with the light source 10 and, likewise, a computer interface 30 is connected with the read mechanism 24 so that the optical recording device is under the control of a computer for the purpose of recording, erasing or reading bits of information.

The optical recording device 20 is formed from an ionic insulator such as an alkali metal halide or an alkali-earth halide. The ionic insulator is formed as a crystal and is doped with an alkali metal in stoichiometric excess and negative hydride ions to form a doped crystal. The doping of the crystal with the alkali metal enables the doped crystal to produce a color center light absorption band which causes the crystal to typically exhibit a characteristic visible color. Doping with negative hydride ions to form an alkali-hydride in the crystal structure produces a hydride light absorption band typically in the ultraviolet spectrum.

In order to effect the doping, the crystal is placed in an evacuated vessel along with an alkali metal dopant and is heated to a relatively high temperature on the order of 600° C. for about 30 to 60 minutes. The alkali metal vaporizes and diffuses into the crystal producing a stoichiometric excess of the alkali metal in the crystal which traps electrons having energy levels within the energy gap of the crystal.

The crystal is also doped with negative hydride ions which replace some of the halides in the crystal structure. One method of doping the crystal with the negative hydride ions is to utilize an impure alkali metal such as impure sodium having some sodium hydride as an impurity or impure potassium having potassium hydride as an impurity. By controlling the temperature, time and concentration of the alkali metal with a hydride impurity in the doping process, crystals may be produced that are heavily doped with the alkali metal and the hydride without initially forming a color center band in the crystal. For example, a KBr crystal may be utilized. The KBr crystal is placed in an evacuated vessel with impure sodium metal having sodium hydride impurity. The sodium metal is used in the proportion of about 50-60 mg of the sodium metal per gram of KBr crystal. The crystal and the metal are heated in the evacuated vessel to about 600° C. for 30-60 minutes so that a doped crystal is produced. The doped crystal will desirably have an original state in which the color centers have not been formed. However, if a slight coloration results, the color centers can be thermally bleached by heating the doped crystal to about 500° C. for 10 minutes without affecting the hydride concentration in the crystal.

Figure 2:
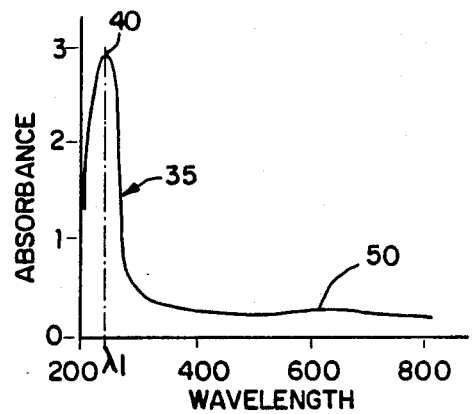
FIGS. 2–4 are graphs showing respectively different characteristic absorbance-wavelength curves of an optical recording device in accordance with the present invention.
Figure 3:
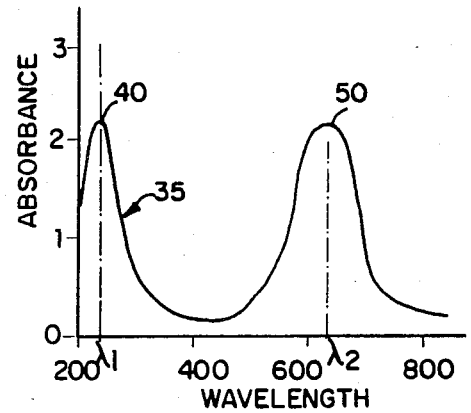
Figure 4:
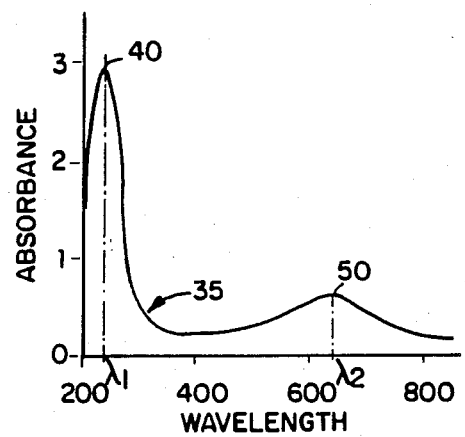

The properties exhibited by the doped KBr crystal at room temperatures are illustrated as an example by the graphs of the characteristic absorbance-wavelength curves shown in FIGS. 2-4. With respect to such graphs, absorbance is provided along the y-axis and is expressed as $-\log T$ where T is the decimal transmission of the crystal. Along the x-axis, the wavelength is expressed in millimicrons.

Referring to FIG. 2, the absorbance-wavelength characteristic absorption curve 35 of a newly processed KBr crystal is illustrated. The newly processed crystal exhibits an original state having a relatively high light absorbance level of about 3 in the hydride band 40 and a low light absorbance level, below 0.5, in the color center band 50. In fact, as illustrated in FIG. 2, the newly processed crystal does not even exhibit a color center band. The KBr crystal has the hydride light absorption band centered about a predetermined wavelength $\lambda_1$. For the doped KBr crystal, the center wavelength $\lambda_1$ for the hydride band is approximately 225 millimicrons and is in the ultraviolet light spectrum (UV). It must be recognized, however, that the wavelength $\lambda_1$ may vary from 225 millimicrons depending on variations in the doping process. The absorption curve 35 illustrates that there is a relatively high degree of absorbance of light in the hydride band wavelength centered about wavelength $\lambda_1$.

As illustrated in FIG. 3, if the newly processed KBr crystal is exposed to a switching light of UV irradiation having a relatively high intensity for a predetermined time period in the hydride absorption band, the doped crystal exhibits a change in the characteristic absorbance-wavelength curve. As shown in FIG. 3, the absorbance of light having wavelength or frequencies in the hydride band 40 centered about wavelength $\lambda_1$ will decrease and the color center light absorption band 50 centered about wavelength $\lambda_2$ will increase. For the doped KBr crystal, the wavelength $\lambda_2$ is approximately 630 millimicrons. Since $\lambda_2$ is in the visual spectrum, the increase of the absorbance level of light having wavelengths or frequencies in the color center band centered about wavelength $\lambda_2$ will cause at least a portion of the crystal which is doped with the hydride ions to develop a visually perceptable color. By irradiation with the ultra-violet switching light, the doped crystal switches from its original state illustrated in FIG. 2 to a second state illustrated in FIG. 3. In the second state, the doped crystal exhibits relatively high or an increased light absorption level of about 2 in the color center band and a relatively low or decreased light absorption level of about 2 in the hydride band.

The doped crystal may be switched from the second state illustrated in FIG. 2 back to a first state having properties resembling the original state of the doped crystal. In the first state, the doped crystal exhibits a relatively higher light absorbance level in the hydride band and a relatively lower light absorbance level in the color center band. The state of the doped crystal may be switched from the second state to the first state with a switching light of a relatively high intensity for a predetermined time period having a wavelength or frequency in the color center band. The switching light causes the absorbance level of the color center band to decrease while the absorbance level of the hydride band increases. As illustrated in FIG. 4, the characteristic absorbance-wavelength curve 35 of the doped crystal is illustrated after a switching light is irradiated onto the doped crystal, thereby switching the doped crystal to the first state. As illustrated, the absorbance level of the hydride band 40 centered about wavelength $\lambda_1$ increases from a level slightly above 2, as illustrated in FIG. 2, to a level of about 3, as illustrated in FIG. 4. The absorbance of the color center band 50 decreases from a level of 2, as illustrated in FIG. 3, to an absorbance level of about 0.5 or 0.6, as illustrated in FIG. 4. When the doped crystal is switched to the first state, illustrated in FIG. 4, the doped crystal has a relatively high absorbance level in the hydride band, as compared to the second state of the doped crystal illustrated in FIG. 3, and a relatively low absorbance level in the color center band, as also compared to the state of the doped crystal illustrated in FIG. 3. The doped crystal may be repeatedly switched between the first state illustrated in FIG. 4 and the second state illustrated in FIG. 3 upon the irradiation of the appropriate switching light onto the doped crystal.

As illustrated in FIGS. 3 and 4, when the state of the crystal is changed, the absorbence level of the color center band 50 changes by about 1.5. The absorbance level of the hydride band changes by about 0.7. Since absorbence is proportional to minus log T, a unit change in the absorbance level equals a change in the transmission of the light through the medium of a factor of 10. A change in the transmission by a factor of 10 is readily detectable, for example, by measuring the transmission through the medium of a read light having a frequency in the color-center band and a relative low intensity which is not sufficient to switch the state of the crystal. Of course, a change in the transmission by less than a factor of 10 between the respective states is also useful and may be effected in faster switching times.

An energy density of between 0.1 and 1 joule/cm$^2$ produces a change in the transmission of a crystal layer of about 1 mil thick from clear to colored by a factor of 10 and produces a corresponding change in the absorbance by a level of 1. Such a change may be effected in much less than a minute.

Changes in the absorbance level of up to approximately 1 in the color center band will be generally linear with respect to changes in the energy density to which the doped crystal is exposed. Only that portion of the crystal, such as a surface area, which has been doped with negative hydride ions will change states by exposure of a layer of about 1 mil thick to an energy density of less than 1 joule/cm$^2$. An initial absorbance level of at least 1 in the hydride band for a crystal layer of approximately 1 mil thick is desirable when the crystal is in its original or first state having a relatively high absorbance level in the hydride band and a relatively low absorbance level in the color center band. Since the doped crystal has different absorbance levels in different states, the doped crystal functions to store bits of information corresponding to digital "highs" or digital "lows". The doped crystal exhibits a stable and a nonvolatile memory since the doped crystal will remain in one state or the other until switched into the other state. In addition, the doped crystal may be repeatedly switched from one state to the other so that the doped crystal exhibits an erasable memory. Repeated switchability from one state to another has been observed for crystals of KBr, KCl, Nacl, RbI and mixed salts of KBr and KCl.

Another property exhibited by the doped crystals is that both the hydride band and the color center band for different crystals are centered about respectively different wavelengths and, accordingly, different frequencies. As previously discussed, the KBr crystal exhibits a hydride band centered about a wavelength $\lambda_1$ of 2250 Å and a color center band centered about a wavelength $\lambda_2$ of 6300 Å. As previously mentioned, variations in the center wavelengths may exist. A doped NaCl crystal exhibits a hydride band centered about 2000 Å and a color center band centered about 4650 Å. The KCl crystal exhibits a hydride band centered about 2150 Å and a color center band centered about 5600 Å.

By laminating superimposed layers of different crystals together, additional bits of information may be vertically recorded or read from the superimposed layers without movement of the light source. Altering the frequency of the light enables communication with the different crystal layers.

Figure 5:
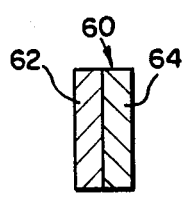
FIG. 5 is a diagrammatic view showing a bi-layered optical recording device in accordance with the present invention.

Referring to FIG. 5, a two-layered optical recording device 60 is depicted. The optical recording device includes a first layer 62 of one type of doped crystal and a second layer 64 of a second type of doped crystal. The crystal layers are laminated and superimposed to form the device 60. As an example, if layer 62 is formed from doped NaCl crystal and layer 64 is formed from doped KBr crystal, layer 62 will have a hydride band centered about a wavelength of 2000 Å and a color center band centered about a wavelength of 4650 Å. Layer 64 will have a hydride band centered about 2250 Å and a color center band centered about 6300 Å.

In the manner previously described, the NaCl crystal in layer 62 can be switched from a first state having a high light absorption level in the hydride band and a low light absorption level in the color center band to a second state having a low light absorption in the hydride band and a high light absorption level in the color center band by irradiating the doped crystal with a switching light of relatively high intensity for a predetermined time period at an ultraviolet frequency in the hydride band. The state of the NaCl crystal in layer 62 can be switched from the second state back to the first state upon the irradiation of the doped crystal with switching light of relatively high intensity for a predetermined time period in the color center band for the NaCl crystal. The frequency of the switching light in the respective hydride band and the color center band for the NaCl crystal may be selected so that the state of the superimposed KBr crystal will not be affected or switched. Likewise, the state of the KBr crystal can be switched by the irradiation of the doped crystal with a switching light in the hydride band or the color center band of the KBr crystal without affecting or switching the state of the NaCl crystal. Since the states of the respective crystal layers 62 and 64 can be independently switched without affecting the state of the other crystal layer, the optical recording device 60 will exhibit a two-bit erasable memory without requiring movement of the light source. Other two layer devices 60 may also be formed. For example, the optical recording device 60 may have a layer 62 of doped KCl crystal and a layer 64 of doped KBr crystal in order to provide a two-bit erasable memory.

Figure 6:
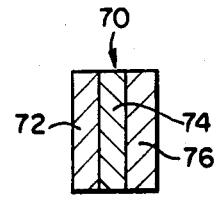
FIG. 6 is a diagrammatic view showing a multi-layered optical recording device in accordance with the present invention.

Additional bits of information may be stored by adding additional layers. As illustrated in FIG. 6, an optical recording device 70 is illustrated having three superimposed and laminated layers. The recording device 70 has an outer layer 72, an intermediate layer 74 and another outer layer 76. By laminating three different doped crystals, the respective crystal layers may be appropriately selected so that a switching light of only two different wavelengths may be utilized to independently switch the three separate layers from the first state having a high light absorbance level in the hydride band and a low light absorbance level in the color center band to the second state having a low light absorbance level in the hydride band and a high light absorbance level in the color center band. For example, the optical recording device 70 may be constructed so that outer layer 72 comprises doped NaCl crystal, intermediate layer 74 includes doped KBr crystal and outer layer 76 includes doped KCl crystal. The independent switching of the three separate layers utilizing only two different wavelengths of light can be effected due to the fact that the intermediate KBr layer does not transmit light having wavelengths less than 2000 Å. Accordingly, irradiating the NaCl layer 72 using a 1850 Å wavelength light from a low pressure mercury lamp of sufficient intensity for a predetermined time period switches the NaCl layer from the first state to the second state because the wavelength of 1850 Å is sufficiently close to the hydride band of the doped NaCl crystal. Since the KBr is opaque to the 1850 Å wavelength light, the switching light will not be transmitted through the second layer and will therefore not impinge upon or affect layer 76. Likewise, if the KCl layer 76 is irradiated with the 1850 Å light from the a low pressure mercury lamp, the KCl crystal layer will switch from the first state to the second state because the wavelength of 1850 Å is sufficiently close to the hydride band of the doped KCl crystal. Once again, the intermediate KBr layer will not transmit the 1850 Å light to the NaCl layer 72 and, hence, the state of the NaCl layer 72 will not be be affected by the irradiation of the switching light onto layer 76. If the optical recording device 70 is irradiated from either side utilizing a 2537 Å wavelength light from the mercury lamp, the KBr layer 74 will switch from the first state to the second state. The 2537 Å wavelength light from the mercury lamp will not affect the states of the NaCl layer 72 or the KCl layer 76 since the hydride bands of the NaCl and the KCl, respectively, have sufficiently different wavelengths to be unaffected by the 2537 Å wavelength light of the mercury lamp. When each of the independent layers are switched to the second state, the color center bands are sufficiently far apart so that each layer of the crystal can be independently read utilizing a read light having an appropriate wavelength corresponding to the color center band for the respective crystal layers. Once again, the intensity of the read light must be sufficiently low to prevent the crystal layers from switching states. The state of the individual layers can be read from either side of the device 70. The state of the individual crystal layers may be independently switched back from the second state to the first state upon the application of switching light of sufficiently high intensity in the respective color center bands of the respective crystal layers. The state of each individual layer may be switched back to the first state by irradiation of switching light on the respective color center bands from either side of the device.

Figure 7:
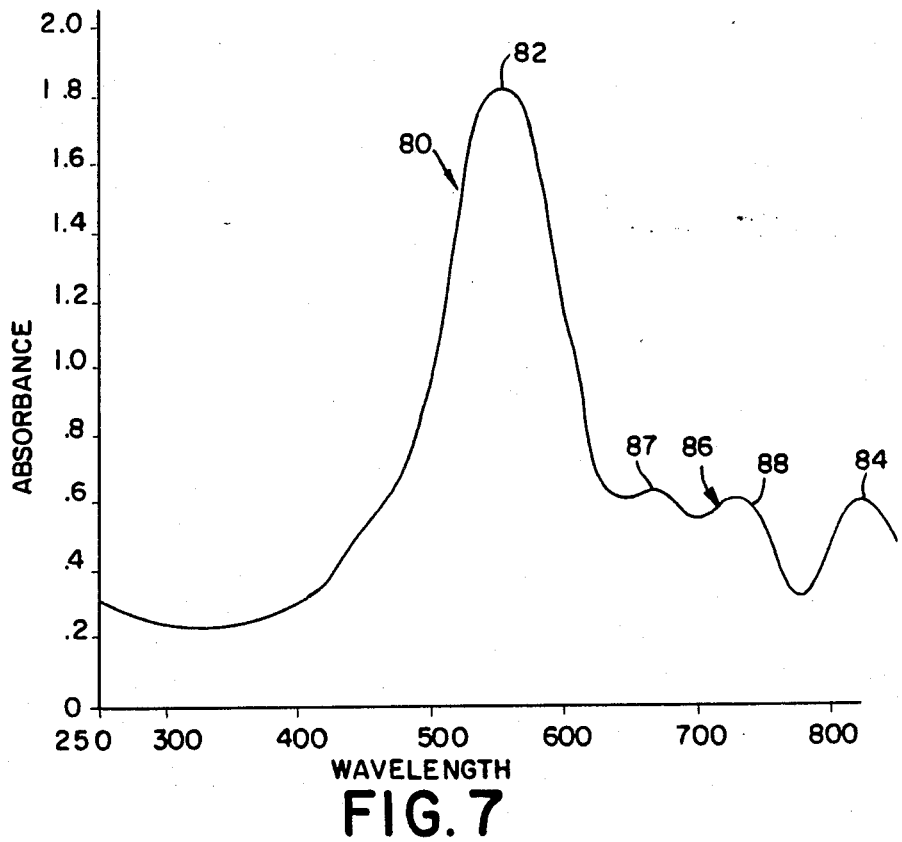
FIG. 7 is a graph of a characteristic absorbance-wavelength curve of a KCl crystal for use in an optical recording device in accordance with another embodiment of the present invention.

A non-erasable optical recording device may also be formed from crystals doped with alkali metals. For example, a crystal such as KCl can be made to exhibit three separate color center bands known as the F band, the M band, and the R band. The KCl crystal is placed in an evacuated vessel with sodium metal in the proportion of 80 milligrams of sodium to one gram of crystal and is then heated to 600° C. for approximately 30 minutes. As illustrated in FIG. 7 by the characteristic absorbance-wavelength curve 80, the processed crystal will initially exhibit a color center band 82 centered about a wavelength of 5600 Å. If the processed crystal is allowed to relax at room temperature for approximately one to two weeks in the dark, the M band 84 centered around the wavelength of approximately 8250 Å will initially form and thereafter an R band 86 comprising a component $R_1$ band 87 and a component $R_2$ band 88 will form. The $R_2$ band will be centered about a wavelength of approximately 7250 Å. The F, M and $R_2$ bands are sufficiently separated with respect to wavelength to provide good discrimination without interference. The absorbance levels of the three bands may be independently reduced by the irradiation of light of a relatively high intensity with a respective frequency corresponding to the respective color center bands.

The energy density required for photobleaching the color center bands to reduce the absorbance of the bands is on the order of ten times the energy density required for photobleaching the crystals that have been made in accordance with the previously described embodiments. The increased energy density which is required is the result of the lack of sufficient traps within the crystals into which the excited electrons can energetically fall.

Figure 8:
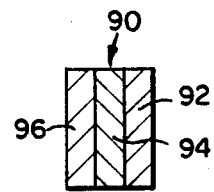
FIG. 8 is a diagrammatic view showing a multilayered device having a KCl crystal with the characteristics illustrated in FIG. 7 in accordance with the present invention.

As illustrated in FIG. 8, an optical recording device 90 is illustrated having a KCl crystal layer 92, a KBR crystal layer 94 and a NaCl crystal layer 96. The crystal layers are superimposed and laminated together to form the device 90. The KCl crystal layer is formed to exhibit the three separate color center bands as discussed above. The NaCl and Kbr crystal layers are prepared in the same manner as the KCl crystal layer but such crystals only exhibit a single color center band. As previously mentioned, the NaCl color center band is centered about a wavelength of 4650 Å and the KBr color center band is centered about a wavelength of 6300 Å. The color center bands of the NaCl and the KBr can be photobleached independently of one another utilizing relatively high intensity light having a frequency within the respective color bands of the NaCl and the KBr crystals. By superimposing and laminating the three crystal layers, an optical recording device 90 is produced in which the color center bands of the NaCl and KBr crystals as well as the three separate color center bands of the KCl crystal have sufficient separation in the wavelength spectrum to provide sufficient discrimination of the respective bands without appreciable interference. Consequently, each of the five separate color bands can be independently photobleached using a light of the appropriate frequency. With the three-layer arrangement, a five-bit, non-erasable memory can be formed with one bit of information being stored in the color center band of the NaCl layer, another bit of information being stored in the color center band of the KBr layer and three bits of information being stored in the respective color center bands of the KCl layer.

It will be recognized by those skilled in the art that changes and modifications may be made without departing from the broad inventive concepts of the invention. It is understood, therefore, that the invention is not limited to the particular embodiments described herein, but is intended to cover all changes and modifications which are within the scope and spirit of the invention as set forth in the appended claims.

What is claimed is:

1. An optical recording device comprising a crystal selected from the group of alkali metal halides and alkali-earth halides and doped with an alkali metal dopant and negative hydride ions to form a doped crystal having a hydride light absorption band centered about a particular frequency and a color center light absorption band centered about another particular frequency, the doped crystal exhibiting two switching states with a first state having a predetermined light absorbance level in the hydride band and a relatively low light absorbance level in the color center band with respect to the other state and a second state having a predetermined light absorbance level in the hydride band and a relatively high light absorbance level in the color center band with respect to the first state and being repeatably switchable between the states by the irradiation of switching light of a selected intensity for a predetermined time period in the hydride band to switch the state of the doped crystal from the first state to the second state and by the irradiation of switching light of a selected intensity for a predetermined time period in the color center band to switch the state of the doped crystal from the second to the first state.

2. The optical recording device in accordance with claim 1 wherein said alkali metal dopant is selected from the group of Na and K.

3. The optical recording device in accordance with claim 1 wherein said doped crystal includes a surface portion doped with sufficient negative hydride ions so that the irradiation of switching light of a selected intensity in the hydride band causes only the surface portion of the doped crystal to switch from the first state to the second state.

4. The optical recording device in accordance with claim 1 wherein the crystal is doped with sufficient alkali metal dopant and negative hydride ions so that the switch from the second state to the first state causes a change in light absorbance in the color center band of approximately one.

5. The optical recording device in accordance with claim 1 wherein the crystal is sufficiently doped with the alkali metal and the negative hydride ions so that the absorbance level of the hydride band in the first state is at least 2 for a layer of the doped crystal having a thickness of 1 mil.

6. The optical recording device in accordance with claim 1 wherein said crystal is selected from the group of alkali metal halides.

7. The optical recording device in accordance with claim 6 wherein said crystal is selected from the group of KBr, KCl, NaCl, RbI, and a mixed salt of KBr and KCl.

8. The optical recording device in accordance with claim 1 wherein the crystal is doped with sufficient amounts of the alkali metal dopant and negative hydride ions so that in the first state the doped crystal exhibits a relatively high light absorbance level in the hydride band with respect to the second state and in the second state exhibits a relatively low light absorbance level in the hydride band with respect to the first state.

9. The optical recording device in accordance with claim 8 wherein the crystal is doped with sufficient amounts of the alkali metal dopant and the negative hydride ions to initially exhibit a state having a high light absorbance level in the hydride band and a low light absorbance level in the color center band relative to the second state of the doped crystal.

10. The optical recording device in accordance with claim 8 wherein the crystal is doped with sufficient alkali metal dopant and negative hydride ions so that the switch from the first state to the second state causes a change in light absorbance in the hydride band of approximately one.

11. The optical recording device in accordance with claim 1 wherein the crystal is sufficiently doped with the alkali metal and the negative hydride ions so that an energy density of at least 0.1 joule/cm$^2$ supplied by the switching light to a layer of the doped crystal having a thickness of 1 mil causes a unit change in the absorbance level of the color center band between the two switching states.

12. The optical recording device in accordance with claim 11 wherein the crystal is sufficiently doped with the alkali metal and the negative hydride ions so that the change in the absorbance level of the color center band up to said unit change is generally linear with respect to a change in the energy density supplied by the switching light up to approximately the energy density of 1 joule/cm$^2$.

13. The optical recording device in accordance with claim 11 wherein the crystal is sufficiently doped with the alkali metal and the negative hydride ions so that the unit change in absorbance level is effected in less than one minute.

14. An optical recording device comprising two laminated, superimposed crystal layers, each layer having a different crystal selected from the group of alkali metal halides and alkali-earth halides and doped with an alkali metal dopant and negative hydride ions to form a respectively doped crystal having a hydride light absorption band centered about a particular frequency and a color center light absorption band centered about another particular frequency, the doped crystals having respective hydride bands and color center bands centered about different frequencies, each doped crystal exhibiting two distinct switching states with a first state having a predetermined light absorbance level in the respective hydride band and a relatively low light absorbance level in the respective color center band with respect to the other state and a second state having a predetermined light absorbance level in the respective hydride band and a relatively high light absorbance level in the respective color center band with respect to the first state and being repeatably switchable between the states by the irradiation for a predetermined time period of switching light of a selected intensity for a predetermined time period in the hydride band to switch the state of the doped crystal from the first state to the second state and by the irradiation of switching light of a selected intensity for a predetermined time period in the color center band to switch the state of the doped crystal from the second state to the first state, the irradiation of switching light of a frequency in the hydride band of the doped crystal in each layer switching the state of the doped crystal in that layer without switching the state of the doped crystal in the other layer and the irradiation of switching light of a frequency in the color center band of the doped crystal in each layer switching the state of the doped crystal in that layer without switching the state of the doped crystal in the other layer.

15. The optical recording device in accordance with claim 14 wherein the crystal in one layer is KBr and the crystal in the other layer is selected from the group of KCl and NaCl.

16. The optical recording device in accordance with claim 14 wherein the said alkali metal dopant is selected from the group of Na and K.

17. The optical recording device in accordance with claim 14 wherein each of said doped crystals includes a surface portion doped with sufficient negative hydride ions so that the irradiation of switching light of a selected intensity in the hydride band causes only the surface portion of the doped crystal to switch from the first state to the second state.

18. The optical recording device in accordance with claim 14 wherein each crystal is doped with sufficient alkali dopant and negative hydride ions so that the switch from the second state to the first state causes a change in light absorbance in light absorbance in the color center band of approximately one.

19. The optical recording device in accordance with claim 14 wherein each crystal is sufficiently doped with the alkali metal and the negative hydride ions so that the absorbance level of the hydride band in the first state is at least 2 for a layer of the doped crystal having a thickness of 1 mil.

20. The optical recording device in accordance with claim 14 wherein each crystal is doped with sufficient amounts of the alkali metal dopant and negative hydride ions so that in the first state the doped crystal exhibits a relatively high light absorbance level in the hydride band with respect to the second state and in the second state exhibits a relatively low light absorbance level in the hydride band with respect to the first state.

21. The optical recording device in accordance with claim 20 wherein each of the crystals is doped with sufficient amounts of the alkali metal dopant and the negative hydride ions to initially exhibit a state having a high light absorbance level in the hydride band and a low light absorbance level in the color center band relative to the second state of the doped crystal.

22. The optical recording device in accordance with claim 20 wherein each crystal is doped with sufficient alkali metal dopant and negative hydride ions so that the switch from the first state to the second state causes a change in light absorbance in the hydride band of approximately one.

23. The optical recording device in accordance with claim 14 wherein each crystal is sufficiently doped with the alkali metal and the negative hydride ions so tha an energy density of at least 0.1 joule/cm$^2$ supplied by the switching light to a layer of each doped crystal having a thickness of 1 mil causes a unit change in the absorbance level of the color center band between the two switching states.

24. The optical recording device in accordance with claim 23 wherein each crystal is sufficiently doped with the alkali metal and the negative hydride ions so that the change in absorbance level of the color center band up to said unit change is generally linear with respect to a change in the energy density supplied by the switching light up to approximately the energy density of 1 joule/cm$^2$.

25. The optical recording device in accordance with claim 23 wherein each crystal is sufficiently doped with the alkali metal and the negative hydride ions so that the unit change in absorbance level is effected in less than one minute.

26. An optical recording device comprising three superimposed crystal layers with an outer first crystal layer, an intermediate second crystal layer and an outer third crystal layer, each layer including a different crystal selected from the group of alkali metal halides and alkali-earth halides and doped with an alkali metal dopant and negative hydride ions to form a respective doped crystal having a respective hydride light absorption band centered about a particular frequency and a respective color center light absorption band centered about another particular frequency, the doped crystals of the three layers having respective hydride bands and color center bands centered about different frequencies, each doped crystal exhibiting two distinct switching states with a first state having a predetermined light absorbance level in the respective hydride band and a relatively low light absorbance level in the respective color center band with respect to the other state and a second state having a predetermined light absorbance level in the respective hydride band and a relatively high light absorbance level in the respective color center band with respect to the first state and being repeatably switchable between the states by the irradiation of switching light of a selected intensity for a predetermined time period in the color center band to switch the state of the doped crystal from the second state to the first state, the doped crystal in each respective layer being selected and the crystal layers being configured so that the hydride bands of the doped crystals in the first and third layers permit a switching light of a single selected frequency to switch the states of either of the doped crystals in the first and third layers without switching the state of the doped crystal in the second layer while the doped crystal in the second layer prevents transmission of the switching light of the single selected frequency for the doped crystals of the first and third layers therethrough and includes a hydride band permitting a switching light of a selected frequency to switch the state of the doped crystal in the second layer without switching the states of the doped crystals in the first and third layers.

27. The optical recording device in accordance with claim 26 wherein the crystal in the first crystal layer comprises NaCl, the crystal in the second crystal layer comprises KBr and the crystal in the third crystal comprises KCl.

28. The optical recording device in accordance with claim 26 wherein said alkali metal dopant is selected from the group of Na and K.

29. The optical recording device in accordance with claim 26 wherein each doped crystal includes a surface portion doped with sufficient negative hydride ions so that the irradiation switching light of a selected intensity in the hydride band causes only the surface portion of the dope crystal to switch from the first state to the second state.

30. The optical recording device in accordance with claim 26 wherein each crystal is doped with sufficient alkali metal dopant and negative hydride ions so that the switch from the second state to the first state causes a change in light absorbance in the color center band of approximately one.

31. The optical recording device in accordance with claim 26 wherein each crystal is sufficiently doped with the alkali metal and the negative hydride ions so that the absorbance level of the hydride band in the first state is at least 2 for a layer of the doped crystal having a thickness of 1 mil.

32. The optical recording device in accordance with claim 26 wherein each crystal is doped with sufficient amounts of the alkali metal dopant and negative hydride ions so that in the first state the doped crystal exhibits a relatively high light absorbance level in the hydride band with respect to the second state and in the second state exhibits a relatively low light absorbance level in the hydride band with respect to the first state.

33. The optical recording device in accordance with claim 32 wherein each crystal is doped with sufficient amounts of alkali metal dopant and the negative hydride ions to initially exhibit a state having a high light absorbance level in the hydride band and a low light absorbance level in the color center band relative to the second state of the doped crystal.

34. The optical recording device in accordance with claim 32 wherein each crystal is doped with sufficient alkali metal dopant and negative hydride ions so that the switch from the first state to the second state causes a change in light absorbance in the hydride band of approximately one.

35. The optical recording device in accordance with claim 26 wherein each crystal is sufficiently doped with the alkali metal and the negative hydride ions so that an energy density of at least 0.1 joule/cm$^2$ supplied by the switching light to a layer of each doped crystal having a thickness of 1 mil causes a unit change in the absorbance level of the color center band between the two switching states.

36. The optical recording device in accordance with claim 35 wherein each crystal is sufficiently doped with the alkali metal and the negative hydride ions so that the change in the absorbance level of the color center band up to said unit change is generally linear with respect to a change in the energy-density supplied by the switching light up to approximately the energy density of 1 joule/cm$^2$.

37. The optical recording device in accordance with claim 35 wherein each crystal is sufficiently doped with the alkali metal and the negative hydride ions so that the unit change in absorbance level is effected in less than one minute.

38. An optical recording device comprising superimposed crystal layers including a first layer having KCl crystal doped with an alkali metal dopant to form a doped crystal having first, second and third color center light absorption bands centered about different frequencies, each color center band of the doped crystal exhibiting two states with a first state having a relatively high light absorbance level in the respective color center band with respect to the other state and a second state having a relatively low light absorbance level in the respective color center band with respect to the first state and each band being switchable from the first state to the second state by irradiation of switching light of a selected intensity for a predetermined time period at a frequency in the respective color center band, and a second layer having a different crystal selected from the group of alkali metal halides and alkali-earth halides and doped with an alkali-metal dopant to form a doped crystal having a color center light absorption band centered about a frequency different from the center frequencies of the color center bands of the KCl crystal, the color center band of the doped crystal in the second layer exhibiting two states with a first state having a relatively high light absorbance level in the color center band with respect to the other state and a second state having a relatively low light absorbance level in the color center band with respect to the first state and being switchable from the first state to the second state by irradiation of switching light of a selected intensity for a predetermined time period at a frequency in the color center band, the irradiation of switching light of a frequency in each color center band switching the state of that color center band without switching the state of the other color center bands.

39. The optical recording device in accordance with claim 38 wherein the crystal in the second layer is selected from the group of NaCl and KBr.

40. The optical recording device in accordance with claim 38 wherein the alkali metal dopant is selected from the group of Na and K.

41. The recording device in accordance with claim 38 including a third layer superimposed over the other layers having a different crystal selected from the group of alkali metal halides or alkali earth halides and doped with an alkali metal dopant to form a doped crystal having a color center light absorption band centered about a frequency different from the center frequencies of the other color center bands, the color center band of the third crystal layer exhibiting two states with a first state having a relatively high light absorbance level in the color center band with respect to the other state and a second state having a relatively low light absorbance level in the color center band with respect to the first state and being switchable from the first state to the second state by irradiation of switching light of a selected intensity for a predetermined time period at a frequency in the respective color center band, the irradiation of switching light of each color band switching the state of that color band without switching the state of the other color bands.

42. The optical recording device in accordance with claim 41 wherein the crystal in one of the second and third layers includes NaCl and the crystal in the other layer includes KBr.

43. The optical recording device in accordance with claim 41 wherein the alkali metal dopant is selected from the group of Na and K.

44. An optical recording device comprising a crystal selected from the group of alkali metal halides and alkali-earth halides and doped with an alkali metal dopant and negative hydride ions to form a doped crystal having a hydride light absorption band centered about a particular frequency and a color center light absorption band centered about another particular frequency, the doped crystal exhibiting two switching states with a first state having a predetermined light absorbance level in the hydride band and a relatively low light absorbance level in the color center band with respect to the other state and a second state having a predetermined light absorbance level in the hydride band and a relatively high light absorbance level in the color center band with respect to the first state and being repeatably switchable between the states by the irradiation of switching light of a selected intensity for a predetermined time period in the hydride band to switch the state of the doped crystal from the first state to the second state and by the irradiation of switching light of a selected intensity for a predetermined time period in the color center band to switch the state of the doped crystal from the second state to the first state, the doped crystal exhibiting one or the other state until such state is switched by the irradiation of switching light so that the doped crystal records bits of information, the state of the doped crystal being readable by measuring the transmission through the crystal in the respective first and second states of a read light having an intensity insufficient to switch the state of the doped crystal.

45. The optical recording device in accordance with claim 44 wherein the read light has a frequency in the color center light absorption band of the doped crystal.

46. An optical recording device comprising a crystal selected from the group of alkali metal halides and alkali-earth halides and doped with an alkali metal dopant and negative ions to form a doped crystal having a negative ion light absorption band centered about a particular frequency and a color center light absorption band centered about another particular frequency, the doped crystal exhibiting two switching states with a first state having a predetermined light absorbance level in the negative ion band and a relatively low light absorbance level in the color center band with respect to the other state and a second state having a predetermined light absorbance level in the negative in the negative ion band and a relatively high light absorbance level in the color center band with respect to the first state and being repeatably switchable between the states by the irradiation of switching light of a selected intensity for a predetermined time period in the negative ion band to switch the state of the doped crystal from the first state to the second state and by the irradiation of switching light of a selected intensity for a predetermined time period in the color center band to switch the state of the doped crystal from the second state to the first state.

47. The optical recording device in accordance with claim 46 wherein said doped crystal includes a surface portion doped with sufficient negative ions so that the irradiation of switching light of a selected intensity in the negative ion band causes only the surface portion of the doped crystal to switch from the first state to the second state.

48. The optical recording device in accordance with claim 46 wherein the crystal is doped with sufficient alkali metal dopant and negative ions so that the switch from the second state to the first state causes a change in light absorbance in the color center band of approximately one.

49. The optical recording device in accordance with claim 46 wherein the crystal is sufficiently doped with the alkali metal and the negative ions so that the absorbance level of the negative ion band in the first state is at least 2 for a layer of the doped crystal having a thickness of 1 mil.

50. The optical recording device in accordance with claim 46 wherein the crystal is doped with sufficient amounts of the alkali metal dopant and negative ions so that in the first state the doped crystal exhibits a relatively high light absorbance level in the negative ion band with respect to the second state and in the second state exhibits a relatively low light absorbance level in the negative ion band with respect to the first state.

51. The optical recording device in accordance with claim 50 wherein the crystal is doped with sufficient amounts of the alkali metal dopant and the negative ions to initially exhibit a state having a high light absorbance level in the negative ion band and a low light absorbance level in the color center band relative to the second state of the doped crystal.

52. The optical recording device in accordance with claim 50 wherein the crystal is doped with sufficient alkali metal dopant and negative ions so that the switch from the first state to the second state causes a change in light absorbance in the negative ion band of approximately one.

53. The optical recording device in accordance with claim 46 wherein the crystal is sufficiently doped with the alkali metal and the negative ions so that an energy density of at least 0.1 joule/cm$^2$ supplied by the switching light to a layer of the doped crystal having a thickness of 1 mil causes a unit change in the absorbance level of the color center band between the two switching states.

54. The optical recording device in accordance with claim 53 wherein the crystal is sufficiently doped with the alkali metal and the negative ions so that the change in the absorbance level of the color center band up to said unit change is generally linear with respect to a change in the energy density supplied by the switching light up to approximately the energy density of 1 joule/cm$^2$.

55. The optical recording device in accordance with claim 53 wherein the crystal is sufficiently doped with the alkali metal and the negative ions so that the unit change in absorbance level is effected in less than one minute.

* * * * *

UNITED STATES PATENT AND TRADEMARK OFFICE
CERTIFICATE OF CORRECTION

PATENT NO. : 4,649,518

DATED : March 10, 1987

INVENTOR(S) : Harry Sadjian

It is certified that error appears in the above-identified patent and that said Letters Patent is hereby corrected as shown below:

```
Column 4, line 56, "Fig. 2" should be --Fig. 3--
Column 5, line 13, "relative" should be --relatively--
Column 5, line 47, "Nacl" should be --NaCl--
Column 6, line 17, after "absorption" insert --level--
Column 7, line 10, delete "a"
Column 8, line 13, "KBR" should be --KBr--
Column 8, line 18, "Kbr" should be --KBr--
```

In Claim 1, at Column 9, line 7, after "second" insert --state--

In Claim 18, at Column 10, line 66, delete the second occurrence of "in light absorbance"

In Claim 23, at Column 11, line 30, "tha" should be --that--

In Claim 26, at Column 12, line 3, after "states" insert --by the irradiation of switching light of a selected intensity for a predetermined time period in the hydride band to switch the state of the doped crystal from the first state to the second state and--

In Claim 29, at Column 12, line 34, after "irradiation" insert --of--

In Claim 29, at Column 12, line 35, "dope" should be --doped--

UNITED STATES PATENT AND TRADEMARK OFFICE
CERTIFICATE OF CORRECTION

PATENT NO. : 4,649,518

DATED : March 10, 1987

INVENTOR(S) : Harry Sadjian

It is certified that error appears in the above-identified patent and that said Letters Patent is hereby corrected as shown below:

In Claim 46, at Column 14, line 68, after "level" delete the first occurrence of "in the negative".

Signed and Sealed this

Twenty-ninth Day of December, 1987

Attest:

DONALD J. QUIGG

*Attesting Officer*  *Commissioner of Patents and Trademarks*